W. J. ARMSTRONG.
BELT SUPPORTING PULLEY SYSTEM.
APPLICATION FILED APR. 19, 1916.
1,371,290.
Patented Mar. 15, 1921.
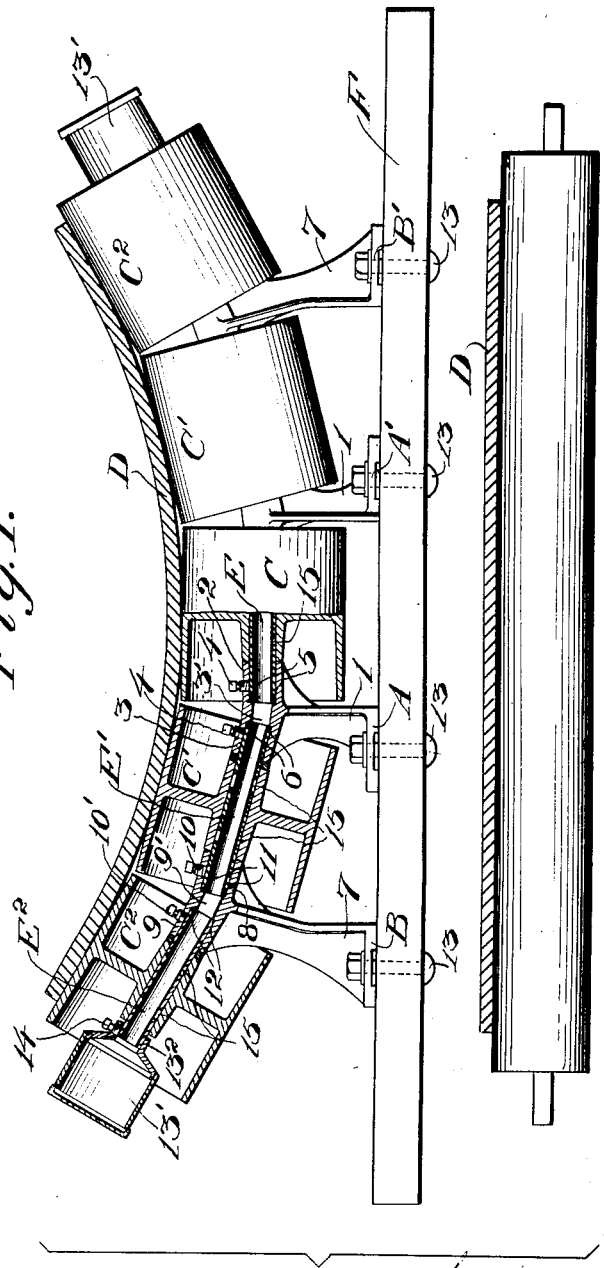
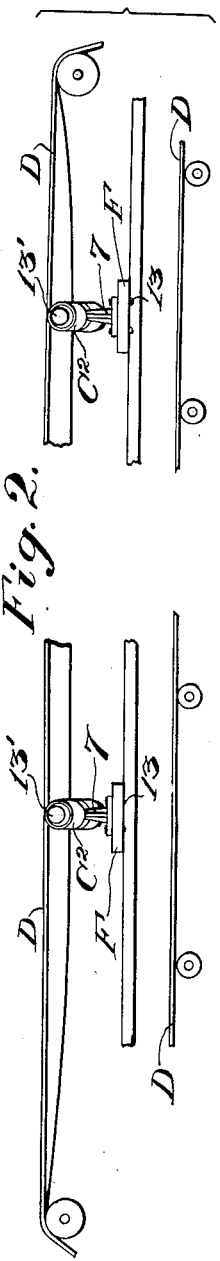

UNITED STATES PATENT OFFICE.

WALTER J. ARMSTRONG, OF COLUMBUS, OHIO, ASSIGNOR TO THE JEFFREY MANUFACTURING COMPANY, OF COLUMBUS, OHIO, A CORPORATION OF OHIO.

BELT-SUPPORTING-PULLEY SYSTEM.

1,371,290.     Specification of Letters Patent.     Patented Mar. 15, 1921.

Application filed April 19, 1916. Serial No. 92,259.

*To all whom it may concern:*

Be it known that I, WALTER J. ARMSTRONG, a citizen of the United States, residing at Columbus, in the county of Franklin and State of Ohio, have invented certain new and useful Improvements in Belt-Supporting-Pulley Systems, of which the following is a specification, reference being had therein to the accompanying drawing.

This invention relates to improvements in the idler pulley systems which are used for supporting conveyer belting of rubber or other flexible material, the systems being so arranged as to provide between the terminals of the conveyer a trough-shaped carrier for the material that is being transported.

The object of the invention is to provide for a wide belt a support of such nature that the belt will not only be supported uniformly from edge to edge, but in such way as to have numerous lines, longitudinally of support. The rotating devices are of such character and of such dimensions and are so arranged that the differences between the lineal speed of the belt and that of the peripheries of the pulleys will be reduced to a minimum, all of the rolling parts being short axially, and being duplicates of each other.

Figure 1 is a view of a belt and one of the sets of supporting devices, the belt and one half of said set of devices being shown in section.

Fig. 2 is a side view of part of the conveyer.

In the drawings a part of a framework or base structure is shown at F. Above this travels the belt D, longitudinally.

Upon the base are fastened four bracket stands A, A', B, B'. Upon these are supported five rolls or pulleys which are relatively short axially and all of the same diameter and similar in other dimensions. The central pulley is indicated by C, the outermost pulleys by $C^2$ and the intermediate ones by C'.

Heretofore belt supports of this sub-class have been provided with three pulleys. The length of the pulleys is limited, for expensive wear of the rubber occurs if this length is so great as to make a large differential in the speeds of the different parts.

I shorten the pulleys, relatively, although they are all interchangeable and of the same dimensions and conformation. The result is that a wide belt can be used and it can be furnished with an elongated support, the chords of which are so short that the belt is practically supported uniformly throughout its entire cross sectional curve.

Each of the stand brackets A, A' has an upright part 1, a horizontally arranged short tubular socket 2 extending inward, and an upward inclined tube socket 3 extending outward, with a central axially apertured part 3'. The horizontal tube socket is shouldered at 5 and the inclined socket is shouldered at 6. The parts 1, 2, 3, 3' of the bracket are all cast integrally together.

With these central or inner stand brackets are combined two peculiarly shaped brackets B and B'. Each of these is formed with an upright 7, a short downward inclined tube socket 8 extending inward, an upward inclined socket 9 extending outward, each of the sockets 8 and 9 being shouldered as at 11 and 12. The stand 7, the tubular sockets 8 and 9 and the central connecting part 9' are all cast integral. The angle of the socket 8 to the horizon is the same as the angle of the socket 3 on the adjacent inner bracket. The angle of inclination to the horizon of the socket 9 corresponds to the curve or desired inclination of the neighboring part of the belt.

The brackets A, A', B, B' are cast with pedestals which are secured by bolts 13 to the frame or base.

E indicates a tubular shaft having one end supported in each of the stand brackets A, A'. It is fitted at the ends in the horizontal sockets 2, being brought to proper position by the shoulders 5; and it is firmly locked by set screws 4. E' indicates an adjacent inclined tubular shaft section, and $E^2$ an upper and outer section; there being one of the shaft sections E' and a shaft section $E^2$ on each side of the center. The sockets 8 being inclined at the same angle or on the lines of inclination of the sockets 3, the shaft section E' is readily fitted to place in these sockets and is locked by set screws 4 and 10.

Each shaft section $E^2$ is fitted into a socket 9 and is locked in place by a set screw 10'.

Upon the shaft sections of this series the five pulleys C, C', C' and $C^2$, $C^2$ are mounted.

An oil passage from end to end of the system is provided by the hollow shafts E, E', E², communication from each to the next being furnished in the axially apertured central parts 3' and 9' of the stand brackets. Each of the tubular shafts is perforated as at 15, 15 to permit sufficient lubricant to pass from the interior of the shafts to the bearing surfaces of the pulleys. The lubricant is supplied from cups 13', one at each end of the lubricating duct. Each cup has an annular base ring 13² which fits tightly the outer end of the shaft and is locked thereon by a set screw 14, this ring serving as a spacing collar for abutting against the end of the pulley hub and locking the pulley in place.

When the parts of the system are assembled they are all held rigidly together except that the pulleys are loose for free rotation. By inclining the sockets 8 to the same angles as those of the sockets 3, although each of these sockets is solid with its bracket, the brackets of the entire set are firmly braced and the shaft axes are held correctly in the same transverse plane. The apertures in the pedestals of the brackets are preferably in the form of short slots so that there can be adjustment for a small fraction of an inch, if necessary, in order to avoid straining of the shafts or binding of the pulleys when the brackets are bolted firmly to the base.

What I claim is:

1. A belt supporting pulley mechanism having two inner stands or brackets each provided with an upright, an inner horizontal socket and an outer inclined socket all cast integral, outer stands or brackets each having an upright, an inner socket inclined downward at the angle of the outer socket of an inner bracket and having an outer socket situated at a greater angle of inclination than its inner socket, the said two sockets and the upright of each outer bracket being all cast integral, a horizontal tubular shaft disposed in the two horizontal sockets of the inner brackets, two intermediate inclined hollow shafts each fitted in the inclined outer socket of an inner bracket and in the inner inclined socket of an outer bracket, two outermost shafts each supported at its inner end in the outer socket of an outer bracket, a central pulley, two intermediate pulleys and two outer pulleys, respectively, mounted on said shaft sections.

2. The combination of brackets B, B', each having a downward and inward inclined socket 8, an upward and outward inclined socket 9 and an axial aperture, hollow shafts E² respectively supported in the sockets 9 at relatively greater angles to the horizon than inclined sockets 8, inner brackets A, A' each having a horizontal socket 2 and an inclined socket 3, shaft sections E' inclined at relatively less angles than shafts E² and each fitted in a pair of the said sockets 3 and 8, a central horizontal shaft section E fitted in the horizontal sockets 3, a series of pulleys comprising a horizontal pulley C on shaft E, two intermediate pulleys C', C', on shafts E', E' and inclined at the relatively less angles, and outermost pulleys C², C² on shafts E², E², inclined at the relatively greater angles.

3. In a supporting mechanism for a troughed conveyer belt, the combination of a transverse supporting base, a central transverse horizontal shaft, brackets securing said shaft to said supporting base, a series of a plurality of relatively short shafts extending laterally in each direction from the central shaft, the shafts of each series being straight and increasingly inclined to the central shaft whereby they approximate the curvature of the belt, all the shafts being in the same transverse vertical plane, supplemental brackets at the sides of those aforesaid secured to and extending upward from the base and each bracket rigidly connected to the adjacent ends of two of said shafts.

In testimony whereof, I affix my signature, in presence of two witnesses.

WALTER J. ARMSTRONG.

Witnesses:
C. H. ANTHONY,
C. R. HELLER.